United States Patent
Ross et al.

[11] Patent Number: 5,836,211
[45] Date of Patent: Nov. 17, 1998

[54] TILT STEERING MECHANISM

[75] Inventors: William J. Ross, Sarasota; Andrew K. Stiteler, Bradenton; Jerald G. Wagner, Venice, all of Fla.

[73] Assignee: IMO Industries, Inc., Sarasota, Fla.

[21] Appl. No.: 798,832

[22] Filed: Feb. 12, 1997

[51] Int. Cl.⁶ ........................................................ B62D 1/18
[52] U.S. Cl. ............................................ 74/493; 280/775
[58] Field of Search ................................ 74/493; 280/775

[56]  References Cited

U.S. PATENT DOCUMENTS

| | | | |
|---|---|---|---|
| 3,167,971 | 2/1965 | Zeigler et al. | 74/493 |
| 3,504,569 | 4/1970 | Zoltok | 74/493 |
| 3,628,396 | 12/1971 | Grobowski | 74/493 |
| 4,649,769 | 3/1987 | Venable | 74/493 |
| 5,136,894 | 8/1992 | Carter et al. | 74/493 |

*Primary Examiner*—Allan D. Herrmann
*Attorney, Agent, or Firm*—Jansson, Shupe, Bridge & Munger, Ltd.

[57]   ABSTRACT

The new tilt steering mechanism includes a housing having a tower and a pair of C-shaped clamps comprising a locking apparatus fixed with respect to the tower. Each clamp has a locking quadrant formed by alternating ridges and grooves. A swivel bar extends along a swivel axis and is trunnion-mounted for pivoting movement with respect to the tower and the clamps. An annular, ring-like locking device is mounted on the swivel bar for movement therealong and is spring biased toward the clamps. Such locking device includes a pair of wedge-shaped locking members for selectively engaging grooves in respective quadrants on the clamps. Other features for excluding dirt from the mechanism and, in the case of a mechanism used to drive a pump and steer a boat, for driving the pump and checking oil level are also disclosed.

32 Claims, 8 Drawing Sheets

TILT STEERING MECHANISM

FIELD OF THE INVENTION

The invention relates generally to land and water vehicle steering and, more particularly, to mechanisms of the type known as "tilt steering" mechanisms.

BACKGROUND OF THE INVENTION

Vehicle steering systems having tilt steering mechanisms are in common use in both land and water vehicles. In a land vehicle such as an automobile, tilt steering is very desirable. The driver is able to tilt the steering wheel to its maximum upward position to make vehicle ingress and egress easier. And the smaller the vehicle, the more convenience that is afforded by a tilt steering mechanism.

Much the same rationale applies to tilt steering mechanisms for boats. But applying tilt steering to boats may present more of a challenge to the design engineer in those instances where the boat is steered hydraulically—and hydraulic steering is widely used. In a typical hydraulic steering arrangement, the boat steering wheel is mechanically coupled to a hydraulic pump. Turning the steering wheel delivers pressurized oil out of one pump port or the other, depending upon the direction of the turn. That is, the boat operator is the pump "prime mover." The pressurized oil is delivered to one end or the other of a hydraulic cylinder used to pivot an outboard engine, a rudder or the like.

One of the reasons that applying tilt steering to a boat is challenging is because the housing is mounted at or near the dashboard and contains a hydraulic pump and a quantity of oil rather than merely containing only grease-lubricated mechanical components. The designer must not only provide a mechanical steering and tilting capability but the oil contents of the housing must be reliably confined. Quite understandably, boat owners are displeased by hydraulic pumps which leak oil.

Another factor which the design engineer must address is the matter of overall steering column length and, particularly, the distance the steering apparatus protrudes rearwardly from the dashboard toward the vehicle operator. A steering column which is unduly long negates, at least in part, the advantages provided by a tilt steering mechanism.

A known type of tilt steering mechanism for boats involves mounting an "add on" set of hardware to the existing through-the-dashboard steering hardware. While this arrangement is certainly operable, the mechanism protrudes rearwardly from the dashboard by a dimension which, in view of the invention, is excessive and unnecessary.

Another undesirable characteristic of such known mechanism relates to the way such mechanism is latched in a particular tilt position. The mechanism has a pivoting lever which protrudes laterally from the mechanism axial centerline and which engages one of several notches to hold a selected tilt position. The pivoting lever can catch on clothing or be inadvertently pivoted out of its latched position.

Yet another characteristic of a known tilt steering mechanism is that some users may not be able to reach the pivot lever without releasing the grasp of one hand from the steering wheel. And the latching mechanism is exposed to the elements and susceptible to entry of dirt—it is difficult to apply a dirt-excluding boot to a tilt steering mechanism having a latch arrangement of this type.

A new tilt steering mechanism which addresses shortcomings of earlier mechanisms would be an important advance in the art.

OBJECTS OF THE INVENTION

It is an object of the invention to provide a new tilt steering mechanism overcoming some of the problems and shortcomings of the prior art.

Another object of the invention is to provide a new tilt steering mechanism which minimizes mechanism protrusion rearwardly from the vehicle dashboard.

Another object of the invention is to provide a new tilt steering mechanism which may include optional mechanical features for protecting the mechanism from dirt.

Still another object of the invention is to provide a new tilt steering mechanism which may include an optional boot for protecting the mechanism from dirt.

Another object of the invention is to provide a new tilt steering mechanism having a latching arrangement concentric with the steering column, thereby reducing the chance of inadvertently "de-latching" the mechanism.

Yet another object of the invention is to provide a new tilt steering mechanism having a locking device which can be operated while maintaining both hands on the steering wheel.

Another object of the invention is to provide a new tilt steering mechanism "integrated" with a hydraulic pump to form a complete ready-to-use (and easy-to-use) product. How these and other objects are accomplished will become apparent from the following descriptions and from the drawings.

SUMMARY OF THE INVENTION

The new tilt steering mechanism includes a housing having a tower extending along a tower axis and a locking apparatus comprising two C-shaped locking clamps fixed with respect to the tower. The tower has plural locating notches and each locking clamp includes a locating finger (preferably two locating fingers), each for engaging a respective one of the locating notches. The locking clamps are secured to the tower by threaded fasteners or the like.

An elongate swivel bar extends from the tower, the clamps circumscribe the swivel bar and have a first locking member thereon. Such locking member preferably comprises a pair of locking quadrants, one on each clamp. Each locking quadrant has a tapered engagement portion which is referred to herein as a clamp-mounted engagement portion. Most preferably, such engagement portion is embodied as a plurality of grooves alternating with a plurality of ridges.

The swivel bar is trunnion-mounted, extends along a swivel axis and is mounted for pivoting movement with respect to the tower and the locking apparatus. A ring-like annular locking device is mounted on and around the swivel bar for movement along the swivel axis. Such locking device includes a second locking member for selectively engaging the first locking member on the C-shaped locking clamps. Preferably, the second locking member has an engagement portion which is conformably shaped to the shape of a clamp engagement portion and which contacts such clamp engagement portion. Such configuration permits the angle between the tower axis and the swivel axis to be adjusted to any one of several different "tilt-wheel" positions. (In this specification, the engagement portion on the swivel bar is referred to as the swivel-mounted engagement portion.)

In another aspect of the invention, the swivel bar includes a pair of trunnion pins which extend laterally from the swivel bar, which are radially spaced apart 180° and which are perpendicular to the swivel axis. The trunnion pins are retained between the tower and the locking apparatus for pivoting movement with respect thereto.

The new tilt steering mechanism has features configured in recognition of the propensity of dirt and contaminants to migrate into mechanical devices and prematurely wear or otherwise adversely affect the life and performance thereof. In the invention, the locking apparatus (comprising the C-shaped clamps) includes an apparatus spherical surface and, preferably, four such surfaces. Similarly, the swivel bar has swivel spherical surfaces and the spherical surfaces on the locking apparatus and on the swivel bar are conformably shaped to one another. That is, such surfaces all have about the same radius of curvature. The surfaces on the swivel bar are in sliding contact with the curved surfaces on the locking apparatus (or at least are very closely spaced thereto) and form what might be described as a sliding seal for excluding dirt and protecting the pins from contaminants.

Another desirable feature of the new mechanism is that the trunnion pins (including their outward ends) are covered by the C-shaped locking clamps and by the tower. Dirt is thereby substantially excluded.

And that is not all. As noted above, the preferred clamp-mounted engagement portion has a plurality of grooves alternating with a plurality of ridges. The ridges extend radially inwardly and each such ridge has an inwardmost ridge surface. The swivel bar includes a barrier panel conformably shaped and sized to be in sliding contact with the ridge surfaces as the swivel bar and panel move with respect to such ridges. The panel thereby provides a barrier which inhibits the entry of contaminants into the grooves.

In yet another aspect of the invention, the swivel bar includes a swivel guide portion extending parallel to the swivel axis and the locking device includes a device guide portion engaging the swivel guide portion and preventing rotating movement of the locking device relative to the swivel bar. The swivel bar has a distal end spaced from the trunnion pins and the locking device is spring-biased toward the trunnion pins and away from the distal end, thereby retaining the locking members in engagement with one another.

To change the angular position of the swivel bar relative to the housing and tower (and thereby change the tilt angle of the steering wheel mounted on the new mechanism), the user grasps the locking device with the finger tips and urges such device toward the steering wheel until the locking device and its second locking member are disengaged from the locking quadrants' ridges and grooves. After such disengagement, the swivel bar and steering wheel may be tilted to a different angle. After attaining the desired angle, the second locking member is released and the spring biases such locking member to re-engage the clamp-mounted engagement portion.

In a variation of this embodiment, the swivel bar, the locking clamps and the annular second locking member are surrounded by a protective boot. A latch-release handle engages the locking device and extends outwardly through the boot for easy grasping by the user.

As noted above, the locking device is spring-biased toward the trunnion pins and away from the distal end. Such spring biasing is by a compression spring "captured" between the locking device and a retaining ring which engages the distal end of the swivel bar. The swivel bar distal end has a circumferential edge and plural sets of edge teeth extending radially outwardly from the edge. The sets of teeth define plural arcuate notches between them and the retaining ring has plural sets of ring teeth.

When assembled for operation, each set of ring teeth engages a respective set of edge teeth, thereby securing the retaining ring to the distal end. But the new mechanism has been configured with ease of service in mind. When the ring is rotated so that the ring teeth are aligned with the arcuate notches, the retaining ring may then be lifted away from the distal end and, in fact, is urged away from such end by the force of the compression spring.

The new tilt steer mechanism also has a number of other desirable features. For example, there is a biasing spring (in tension) extending between the tower and the swivel bar. Such spring urges the swivel bar to a position at which the swivel axis is most sharply angled with respect to the tower axis. The mechanism and its spring are configured in such a way that when the locking device is disengaged from the locking quadrants, the spring urges the swivel bar and steering wheel to the maximum upwardly-tilted position. This affords the user maximum leg and thigh clearance between the steering wheel and the seat for entering or leaving such seat.

Another desirable feature involves the way in which the maximum tilt angle of the swivel bar to the tower and housing is limited. The swivel bar includes a pair of stop surfaces and the tower includes a pair of raised stop pads. One of the stop surfaces on the swivel bar is against a respective one of the stop pads when the swivel axis is at a predetermined maximum angle, upwardly or downwardly angled, with respect to the tower axis.

Yet another desirable feature involves the construction of a steering shaft and the relationship of such shaft to the new mechanism. When the mechanism is assembled for use, a steering shaft extends into and through the swivel bar. Such shaft has first and second shaft components connected by a universal joint which is in registry with the trunnion pins. When the housing contains a hydraulic pump as may be used for steering a boat, the housing is around a pump drive shaft which is coupled to the second shaft component.

Another feature is provided for ease of manufacture and service. In applications, e.g., boat steering, which use a human-powered hydraulic pump for steering, an annular oil seal is between the pump drive shaft and the housing. A plate retains the seal and an annular retaining ring is lodged in a groove in the housing and retains the plate in contact with the seal. With this configuration, there is no need to use drilled and tapped holes and fasteners to hold the plate in place. The retaining ring is readily removed and the seal pulled without removing fasteners around the seal plate.

Another new feature is particularly useful in installations involving hydraulic steering using a housing-confined pump. In a specific embodiment, an oil fill port extends from the housing toward the locking device and, preferably, through the dashboard. In a dashboard of typical thickness, such fill port is accessible without disassembly and without crawling under the dashboard. The user can quickly check whether hydraulic oil needs to be replenished and given the location of the fill port, is more likely to do so. Another feature aids assembly of the mechanism. The housing includes "half-shell" first and second housing components and the tower extends from the first component. Such components include respective locating devices positioning the components with respect to the tower axis. The assembler is able to properly position the locating devices with respect to one another and be assured that the longitudinal axes of the components are radially and axially aligned.

Yet another feature conserves valuable under-dashboard space. In a mechanism involving two housing components which are plastic injection molded or otherwise molded, some slight taper or "draft" is needed to permit separating the components from the mold. One, less preferred approach is to mold a single "full length" first component and embody the second component simply as a cover.

However, the preferred approach involves making each of the first and second components to have about the same length. Each such component has an interior end and an exterior end away from the interior end and each of such components tapers outwardly from the exterior end to the interior end. The interior ends abut at a junction and such junction exhibits the maximum housing radial dimension, e.g., diameter. In that way, both components have the same degree of taper as the less preferred full-length component mentioned above. But because each component "shares" taper, the housing maximum dimension is less using the preferred approach.

Other details of the invention are set forth in the following detailed description and in the drawings.

DETAILED DESCRIPTION OF PREFERRED EMBODIMENTS

Referring first to FIGS. 1, 2, 3, 4 and 17, the new tilt steering mechanism 10 includes a housing having first and second housing 11 components 13 and 15, respectively. A tower 17 extends from the first component 13 and has a reduced dimension, e.g., a diameter, selected to fit into an industry-accepted standard mounting hole in a boat dashboard 19. In a specific embodiment, the dimension is selected to slide-fit into a 3 inch diameter (7.62 cm.) mounting hole. The components 13, 15 and the tower 17 extend along and are generally concentric with a tower long axis 21.

The tower 17 has an enlarged interior chamber 23 through which a steering shaft 25 extends. Two half-cylinder trunnion pads 27a, 27b are formed adjacent to the tower distal end and receive the laterally-extending trunnion pins 29 of the swivel bar 31. As further described below, the swivel bar 31 extends along and is concentric with a swivel axis 33 and as further described below, the new mechanism 10 permits the angle of the swivel axis 33 to be changed with respect to the tower axis 21. The tower 17 also has plural locating notches 35 which respectively receive the locating fingers 37 of the C-shaped locking clamps 39 described below.

Figure 1:
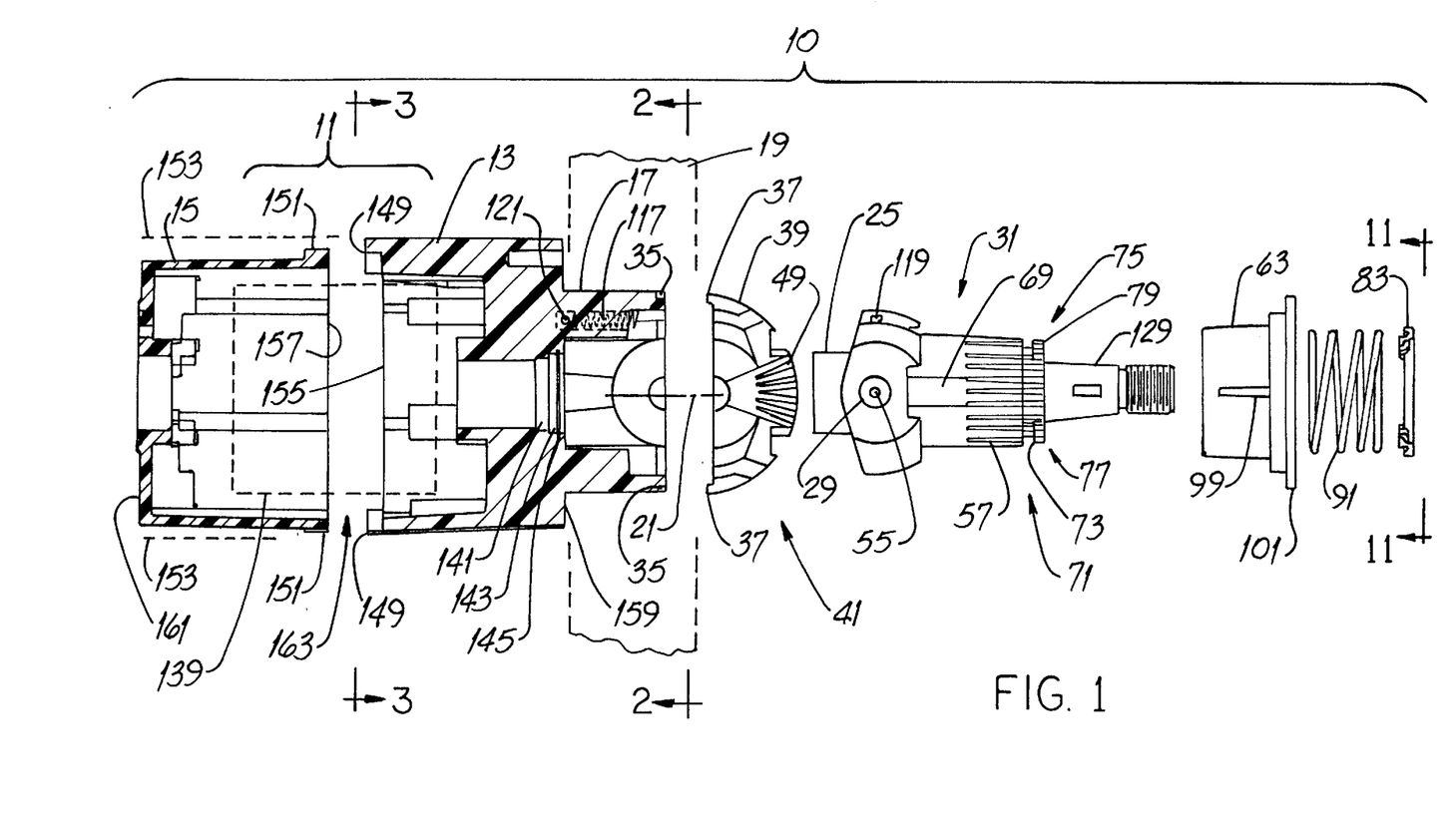
FIG. 1 is an exploded view of the new tilt steering mechanism. Parts are shown in section, other parts are shown in full representation and still other parts are omitted for clarity.
Figure 2:
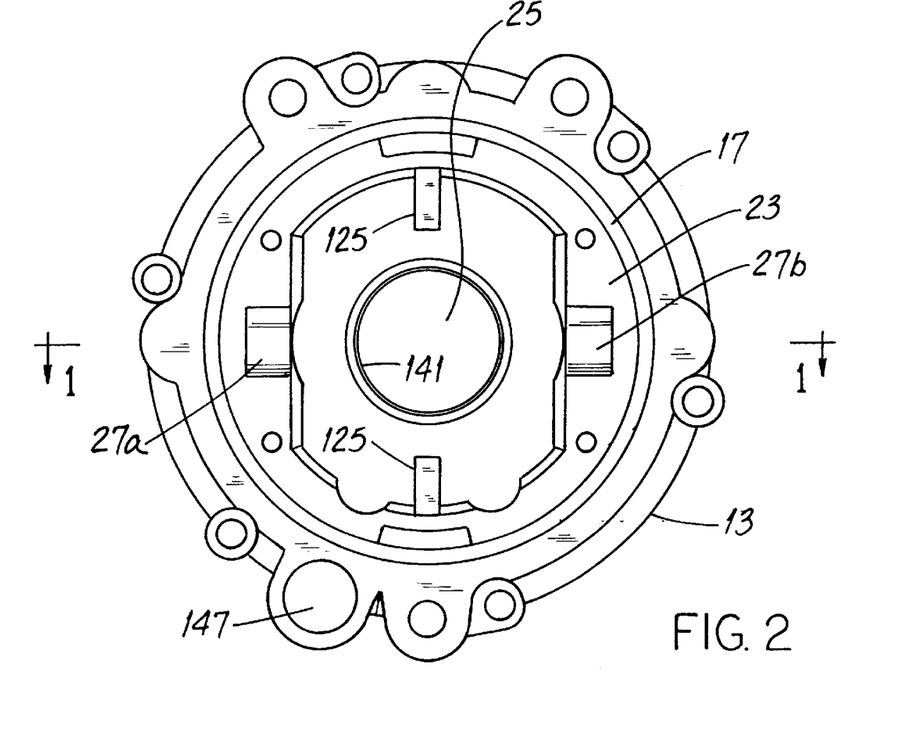
FIG. 2 is an end view of the first housing component taken along the viewing plane 2—2 of FIG. 1.
Figure 3:
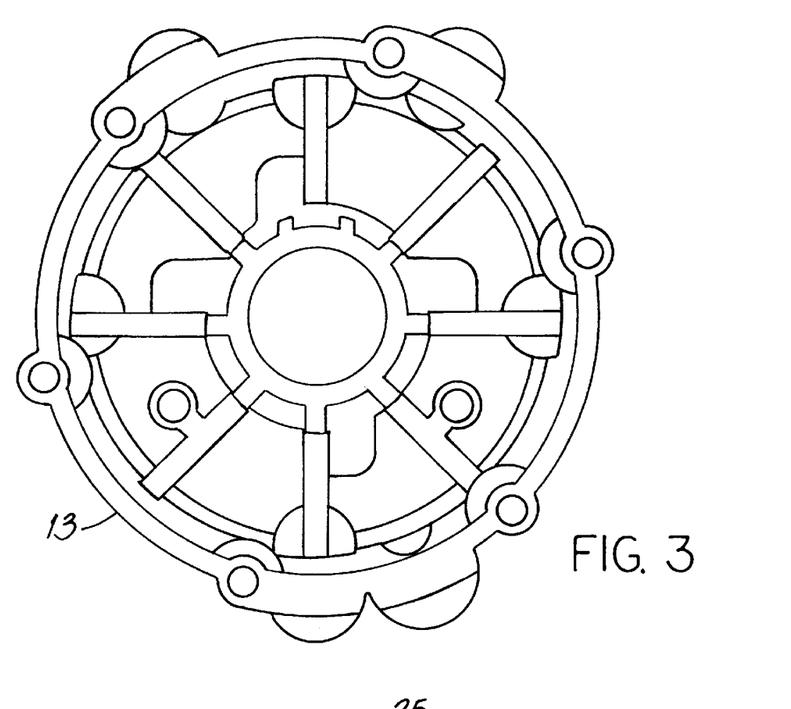
FIG. 3 is another end view of the first housing component taken along the viewing plane 3—3 of FIG. 1.
Figure 4:
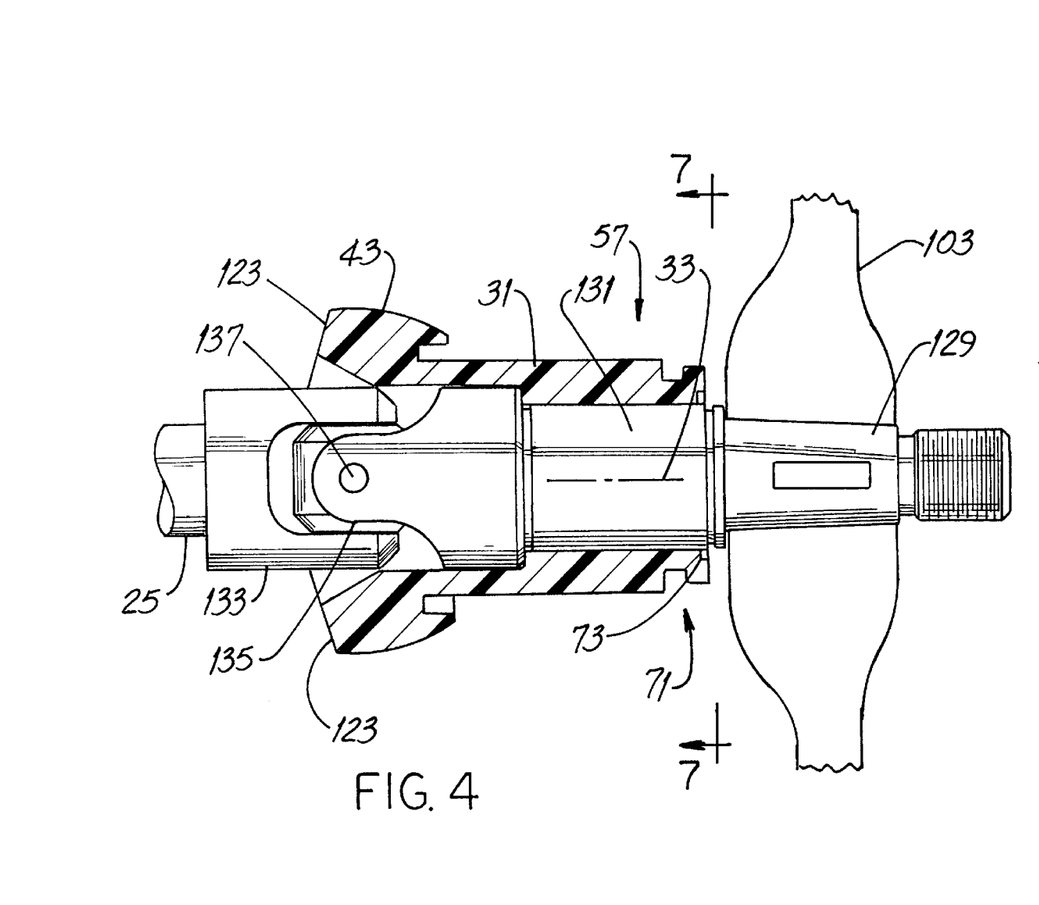
FIG. 4 is a section view of the swivel bar, a component of the mechanism of FIG. 1, shown in conjunction with a universal-joint-type shaft (in full representation) and a steering wheel with part broken away.
Figure 5:
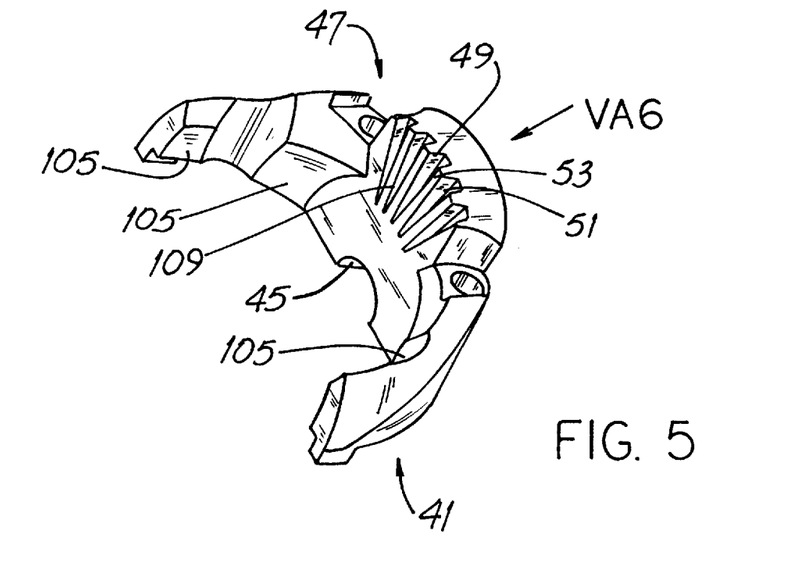
FIG. 5 is a perspective view of one of two identical C-shaped locking clamps used with the mechanism of FIG. 1.
Figure 6:
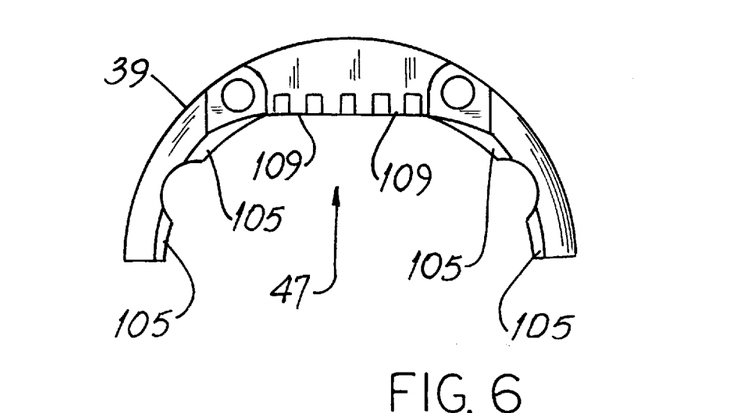
FIG. 6 is a view of the locking clamp shown in FIG. 5 taken along the viewing axis VA6 thereof.

Referring to FIGS. 1 4, 5 and 6, the new mechanism 10 includes a locking apparatus comprised of two C-shaped locking clamps 39 bolted or otherwise attached to the tower. In FIG. 1, that locking clamp 39 away from the viewer is shown while an identical locking clamp 39, which would otherwise be toward the viewer, is omitted for clarity of explanation. Each locking clamp 39 extends about 180° around the proximal end 43 of the swivel bar 31.

Each locking clamp 39 has a half-cylinder trunnion pad 45 that is in registry with a respective one of the tower trunnion pads 27a, 27b when the locking clamps 39 are mounted. Each trunnion pin 29 is thereby confined for pivoting movement between the tower 17 and a respective clamp 39. Each locking clamp 39 also has a first locking member 47 embodied as a quadrant 49 having a plurality of grooves 51 alternating with a plurality of ridges 53. The centerlines of the grooves 51 and ridges 53 converge at the pivot axis 55 of the trunnion pins 29.

Referring next to FIGS. 1, 4, 7 and 8, the swivel bar 31 has a guide portion 57 embodied with a plurality of teeth 59 and between-teeth spaces 61. Preferably, the teeth 59 are spaced equidistant from one another, equidistant from the swivel axis 33 and are oriented generally parallel to such axis 33. The portion 57 guides the locking device 63 (described in more detail below) as such device 63 is moved along the swivel bar 31.

Referring to FIGS. 1, 7, 8, 9 and 10, the mechanism 10 has a locking device 63 with at least one and preferably a pair of flat surfaces 65. Such surfaces are 180° apart and define chords of the device circle 67. The swivel bar 31 also has at least one and preferably a pair of flat surfaces 69. Such surfaces 69 are also 180° apart and define chords of the swivel bar circular perimeter. As the locking device 63 moves along the bar 31, the surfaces 65, coact with the surfaces 69, to guide the device 63 and prevent rotation thereof with respect to the bar 31.

As shown in FIGS. 1, 4, 7, 8, 11 and 12, the swivel bar distal end 71 has a circumferential edge 73 and, preferably, two sets 75, 77 of edge teeth 79 extending radially outwardly from the edge 73. The sets 75, 77 of teeth 79 define plural arcuate notches 81 between them.

Figures 8, 11, 12:
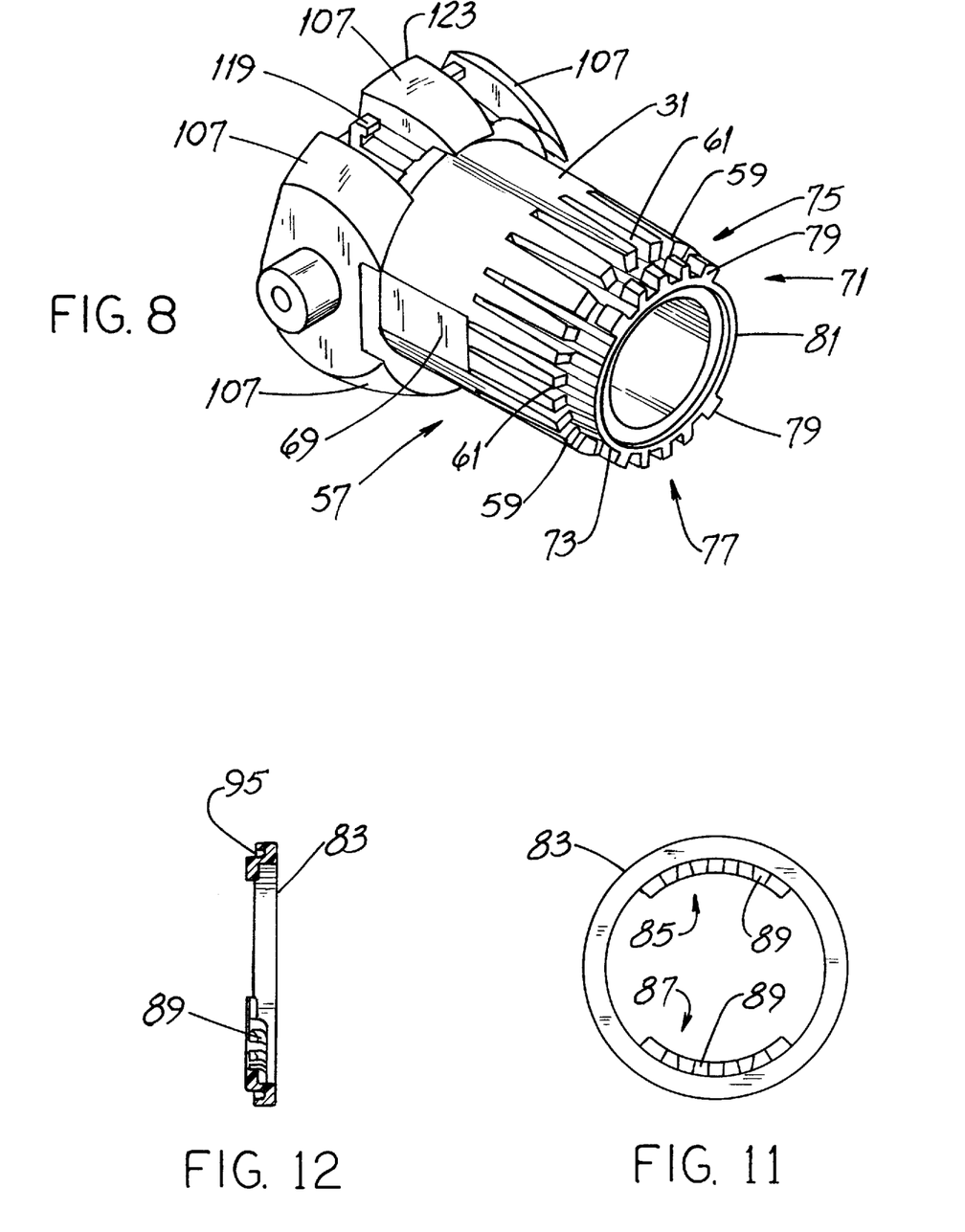
FIG. 8 is a perspective view of the swivel bar shown in FIGS. 4 and 7.
FIG. 11 is a full-representation view of the retaining ring, another component of the mechanism of FIG. 1. The view is taken along the viewing plane 11—11 of FIG. 1.
FIG. 12 is an enlarged edge-wise section view of the retaining ring of FIG. 11.
Figure 9:
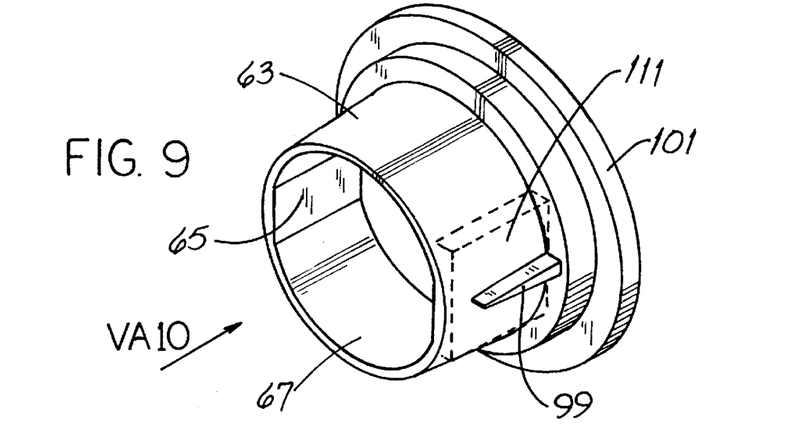
FIG. 9 is a perspective view of a locking device, a component of the mechanism shown in FIG. 1. Surfaces of parts are shown in dashed outline.
Figure 10:
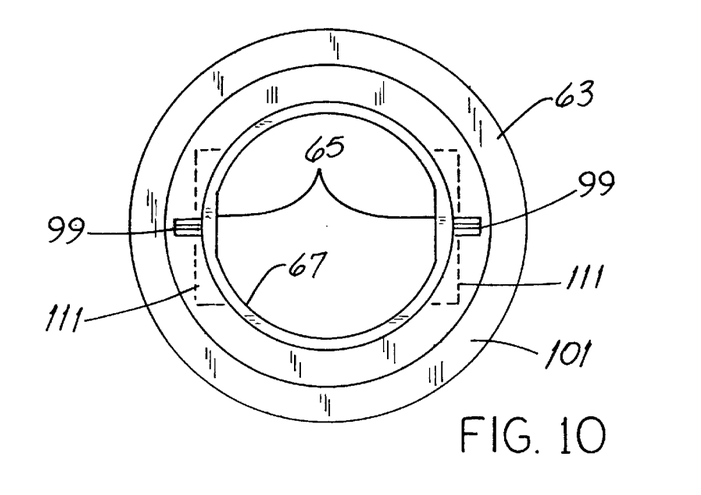
FIG. 10 is a view of the device of FIG. 9 taken along the viewing axis VA10 thereof. Surfaces of parts are shown in dashed outline.

Similarly, the retaining ring 83 has two sets 85, 87, respectively, of ring teeth 89 extending radially inwardly from the ring body. When assembled for operation, each set 85, 87 of ring teeth 89 engages a respective set 75, 77 of edge teeth 79 to secure the retaining ring 83 to the distal end 71. When the ring 83 is rotated so that the ring teeth sets 85, 87 are aligned with the arcuate notches 81, the retaining ring 83 may be lifted away from the distal end 71. The embodiment shown in FIGS. 1, 8 and 11 is particularly well suited for manufacture by injection molding.

Figure 13:
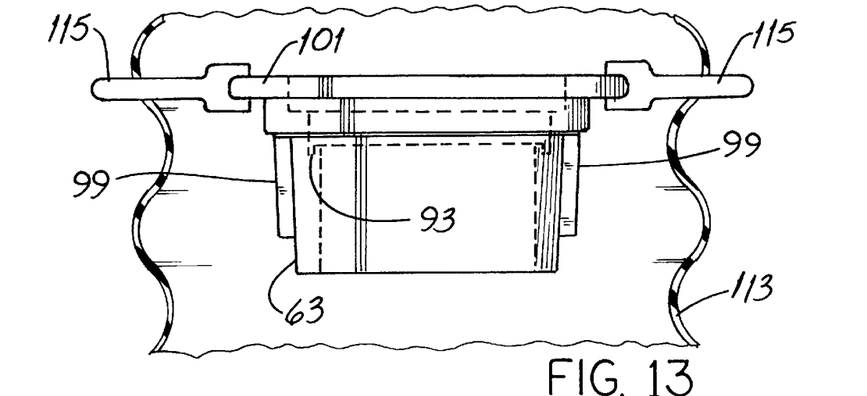
FIG. 13 is a section view of a protective boot shown in conjunction with the locking device of FIG. 9 in full representation. Surfaces of parts are shown in dashed outline.

Referring also to FIG. 13, a compression spring 91 fits into an annular spring groove 93 in the locking device 63 and into an annular spring groove 95 in the retaining ring 83. Such compression spring 91 urges the locking device 63 into engagement with the quadrants 49 of the locking clamps 39 to secure the swivel bar 31 at a fixed angle with respect to the tower axis 21.

Referring again to FIGS. 1, 4, 5, 9, 10 and 13, the ring-like annular locking device 63 is mounted on and around the swivel bar 31 for movement along the swivel axis 33. Such locking device 63 includes a pair of wedge-shaped second locking members 99, which are circumferentially spaced 180° from one another and which are generally parallel to the swivel axis 33. Retention of the swivel bar 31 at a fixed angle is achieved by the spring 91 urging each member 99, into a respective one of the grooves 51 in a respective one of the C-shaped clamps 39.

From the foregoing, it is apparent that while the new mechanism 10 is certainly operable if the grooves 51 and members 99, are rectangular or some other shape, configuring such grooves 51 and members 99, to be wedge shaped provides swivel bar position retention which is free of slight mechanical clearance or "play" in the mechanism 10.

To change the angular position of the swivel bar 31 relative to the housing 11 and tower 17, the user grasps the rim 101 of the locking device 63 with the finger tips (while still retaining the grasp on the steering wheel 103) and urges such device 63 toward the steering wheel 103 until the locking device 63 and its second locking members 99 are disengaged from the locking quadrants' ridges 53 and grooves 51. After such disengagement, the swivel bar 31 and steering wheel 103 may be tilted to a different angle. After attaining the desired angle, the locking device 63 is released and the spring 91 biases such device 63 to re-engage its locking members 99 with respective grooves 51 in respective quadrants 49 of the clamps 39.

The new tilt steering mechanism 10 has features configured in recognition of the propensity of dirt and contaminants to migrate into mechanical devices and prematurely wear or otherwise adversely affect the life and performance thereof. One such feature is depicted in FIGS. 5, 6, 7 and 8. Each clamp 39 has, preferably, four spherical surfaces 105 and the swivel bar 31 has corresponding spherical surfaces 107.

All of the surfaces 105, 107 have about the same radius of curvature and such radii are selected so that the surfaces 107 on the swivel bar 31 are in sliding contact with the curved surfaces 105 on the clamps 39 or at least are very closely spaced thereto. Such surfaces 105, 107 form a sliding seal for excluding dirt and thereby protecting the pins 29 from contaminants.

Another desirable feature of the new mechanism 10 is that the trunnion pins 29 are nested in the tower 17 and retained there by the C-shaped locking clamps 39. The tower 17 and the clamps 39 coact to substantially entirely cover the trunnion pins 29 and exclude dirt.

Still another feature which aids in excluding dirt from the locking quadrants 49 is shown in FIGS. 5, 6, 9, 10 and 16.

The ridges 53 extend radially inwardly (i.e., toward the axis 21) and each such ridge 53 has an inwardmost ridge surface 109. The locking device 63 includes a pair of barrier panels 111, each of which is conformably shaped and sized to be in sliding contact with the ridge surfaces 109 adjacent thereto. The panels 111 provide barriers which inhibit the entry of contaminants into the respective grooves 51 covered by such panels 111.

Referring particularly to FIG. 13, irrespective of whether the mechanism 10 is configured to have the surfaces 105, 107 and/or the panels 111, described above, the swivel bar 31, the locking clamps 39 and the locking device 63 may be surrounded by a protective boot 113. A pair of oppositely-extending latch-release handles 115 engage the rim 101 of the locking device 63 and extend outwardly through the boot 113 for easy grasping by the user.

Figure 7:
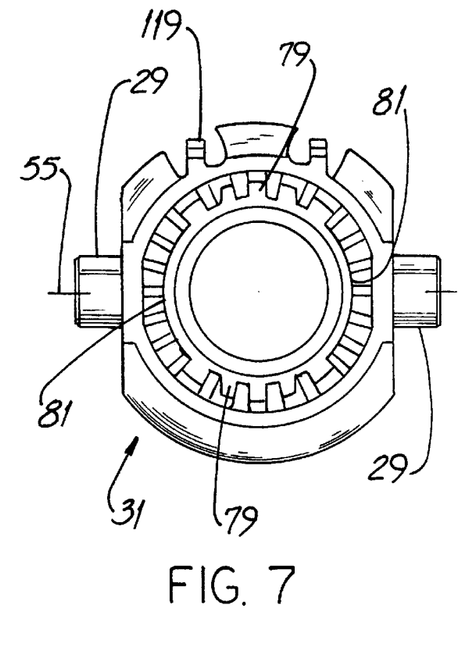
FIG. 7 is a full-representation view of the swivel bar shown in FIG. 4 and taken along the viewing plane 7—7 thereof. The shaft is omitted.

The new tilt steer mechanism 10 also has a number of other desirable features. Referring to FIGS. 1, 7 and 8, there is a tension biasing spring 117, one end of which is coupled to a hook 119 on the swivel bar 31. A lateral hole 121 is formed in the tower 17 and receives a pin to which the other end of the spring 117 is attached. When the locking members 99 are released from their respective grooves 51 (and in the absence of a significant downward force on the steering wheel 103), the spring 117 urges the swivel bar 31 to its maximum upwardly-tilted position at which the swivel axis 33 is at its most sharply angled, upwardly-tilted position with respect to the tower axis 21. This affords the user maximum leg and thigh clearance between the steering wheel 103 and the seat for entering or leaving such seat.

Another desirable feature involves the way in which the maximum tilt angle of the swivel bar 31 to the tower 17 and housing 11 is limited. As shown in FIGS. 1, 2, 4, 7 and 8, the swivel bar 31 includes a pair of stop surfaces 123 and the tower 17 includes a pair of raised stop pads 125. One of the stop surfaces 123 on the swivel bar 31 is against a respective one of the stop pads 125 when the swivel axis 33 is at a predetermined maximum angle, upwardly or downwardly angled, with respect to the tower axis 21.

Referring to FIGS. 1, 2, 4 and 7, yet another desirable feature involves the construction of a steering shaft 129 and the relationship of such shaft 129 to the new mechanism 10. When the mechanism 10 is assembled for use, a steering shaft 129 extends into and through the swivel bar 31. Such shaft 129 has first and second shaft components 131, 133, respectively, connected by a universal joint 135, the pin 137 of which is in registry with the trunnion pins 29. When the housing 11 contains a hydraulic pump 139 as may be used for steering a boat, the housing 11 is around a pump drive shaft 25 which is coupled to the second shaft component 133.

Another feature is provided for ease of manufacture and service. In applications, e.g., boat steering, which use a human-powered hydraulic pump 139 for steering, an annular oil seal 141 is between the pump drive shaft 25 and the housing 11. A plate 143 retains the seal 141 and an annular retaining ring 145 is lodged in a groove in the housing 11 and retains the plate 143 in contact with the seal 141. With this configuration, there is no need to use drilled and tapped holes and fasteners to hold the plate 143 in place. The retaining ring 145 is readily removed and the seal 141 pulled without removing fasteners around the seal plate 143.

Another new feature is particularly useful in installations involving hydraulic steering using a housing-confined pump 139. In a specific embodiment shown in FIG. 2, an oil fill port 147 extends from the housing 11 toward the locking device 63 and, preferably, through the dashboard 19. Such fill port 147 is accessible without disassembling the mechanism 10 and without crawling under the dashboard 19. The user can quickly check whether hydraulic oil needs to be replenished and given the location of the fill port 147, is more likely to do so.

Another feature aids assembly of the mechanism 10. As shown in FIG. 1, the housing 11 includes "half-shell" first and second housing components 13, 15, each of which includes locating devices 149, 151, respectively, for positioning the components 13, 15 with respect to the tower axis 21. The assembler is able to properly position the locating devices 149, 151 with respect to one another and be assured that the components 13, 15, are radially and axially aligned.

Yet another feature conserves valuable under-dashboard space. In a mechanism 10 involving two housing components 13, 15 which are plastic injection molded or otherwise molded, some slight taper or draft is needed to permit separating the components 13, 15 and the mold from one another. One, less preferred approach is to mold a single "full length" first component 13 and embody the second component 15 simply as a cover. Using that approach, the outer profile of the first component 13 would generally be as represented by the dashed lines 153 in FIG. 1.

However, the preferred approach involves molding the first and second components 13, 15 to have about the same length as shown in FIG. 1. The first and second components 13, 15 each have an interior end 155, 157, respectively, and an exterior end 159, 161, respectively. Such exterior ends 159, 161 are away from the respective interior ends 155, 157 and each of such components 13, 15 tapers outwardly from the exterior end to the interior end. The interior ends 155, 157 abut at a junction 163 and such junction 163 exhibits the maximum housing radial dimension, e.g., diameter. In that way, both components 13, 15 have the same degree of taper as the less preferred full-length component 13 mentioned above. But because each component 13, 15 shares taper, the housing maximum dimension is less using the preferred approach.

When considering the specification, the following should be borne in mind. The descriptions of the swivel bar 31 and the retaining ring 83 refer to "sets" 75 of edge teeth 79 and "sets" 85 of ring teeth 89. A set 75, 85 may include but a single tooth 79, 89 to fit into a single groove.

Figure 14:
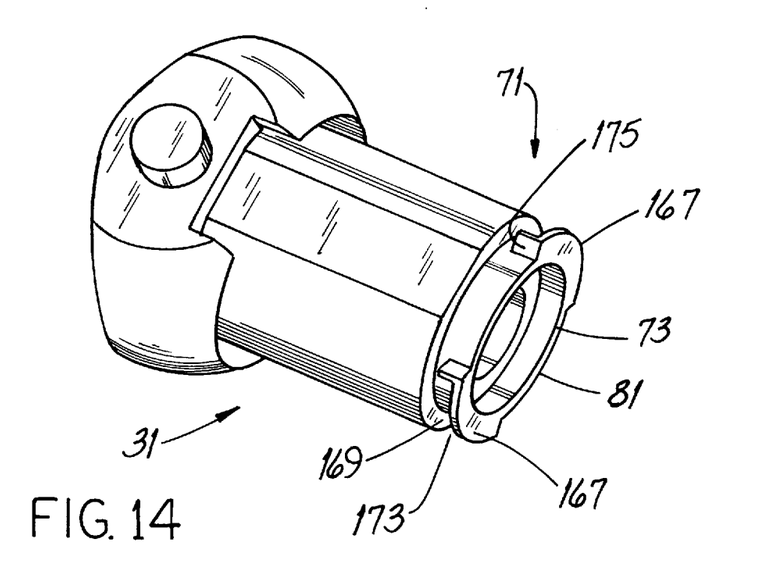
FIG. 14 is a perspective view of another embodiment of the swivel bar shown in FIGS. 7 and 8.
Figure 15:
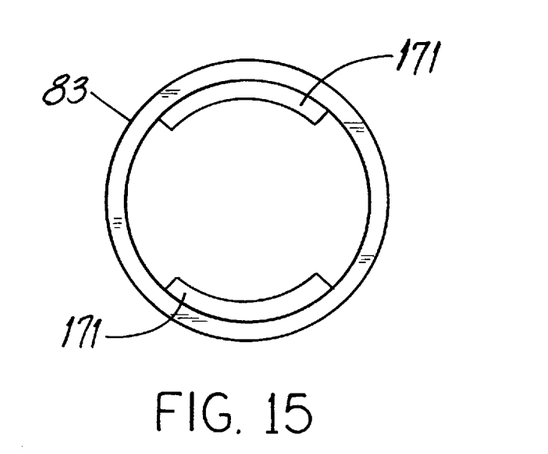
FIG. 15 is a view of another embodiment of the retaining ring shown in FIG. 11.
Figure 16:
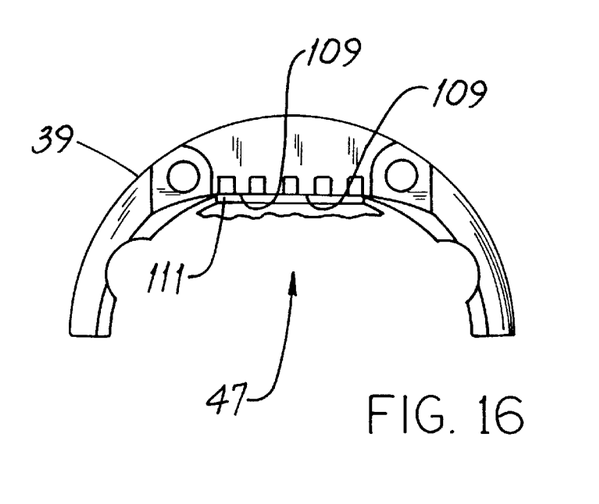
FIG. 16 is a view generally like that of FIG. 6 and showing a barrier panel on the locking device contacting ridges on the locking quadrant. Parts are broken away.
Figure 17:
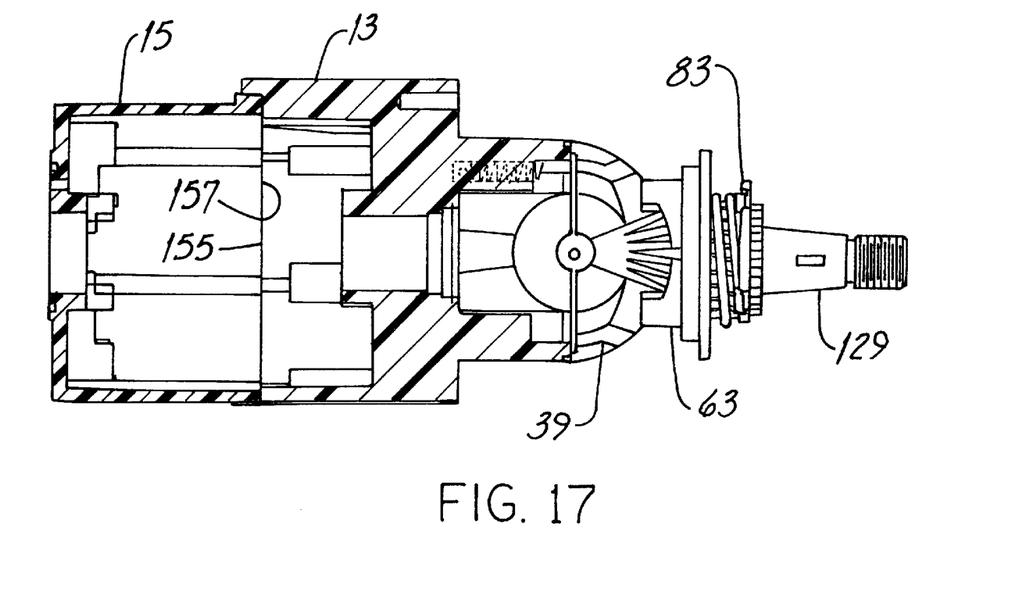
FIG. 17 is a view of the assembled tilt steering mechanism shown in FIG. 1. Parts are shown in section, other parts are shown in full representation and still other parts are omitted for clarity.

FIGS. 14 and 15 show other embodiments of the swivel bar 31 and the retaining ring 83, respectively, which are particularly well suited for manufacture by, e.g., machining or die casting. As shown in FIG. 14, the swivel bar distal end 71 has a circumferential edge 73 and two bar lugs 167 spaced 180° apart and extending radially outwardly from the edge 73. The lugs 167 define plural arcuate notches 81 between them and each lug 167 includes a cutout 169 of reduced axial thickness.

Similarly, the retaining ring 83 has two ring lugs 171 spaced 180° apart and extending radially inwardly from the ring body. To assemble the ring 83 to the end 71, the ring lugs 171 are aligned with the arcuate notches 81 and against spring force, the ring 83 is placed upon the end 71 until the lugs 171 are in registry with the channel 173. The ring 82 is thereupon rotated about 90° until the lugs 171 are in registry with the cutouts 169. The ring 83 is then released so that each lug 171 engages a respective cutout 169. When the ring 83 is so positioned, cutout barriers 175 prevent significant rotation of the ring 83 with respect to the bar 31.

As used herein, the term "spherical surface" refers to a surface, all points of which are at the same or substantially the same radius distance from a center point and the area of which is substantially less than that of a sphere having the same radius distance.

While the principles of the invention have been shown and described in connection with preferred embodiments, it is to be understood clearly that such embodiments are by way of example and are not limiting. For example, the quadrants 49 are described as having alternating ridges 53 and grooves 51, the latter for receiving the locking members 99 of the device 63. In an alternate configuration, a locking member 99 may be embodied as a groove to engage one of the ridges 53 of a quadrant 49. Similarly, the guide portion 57 may be configured to be, e.g., hexagon or octagon in cross-sectional shape and the inner perimeter of the locking device 63 conformably shaped. And as another example, the swivel bar 31 may not be configured with integral trunnion pins 29 but with a trunnion comprising a separate pivot bolt or the like.

What is claimed:

1. A tilt steering mechanism including:
    a housing having a tower extending along a tower axis;
    a locking apparatus fixed with respect to the tower and having a first locking member thereon;
    a trunnion swivel bar extending along a swivel axis and mounted for pivoting movement with respect to the tower and the locking apparatus; and
    a locking device mounted on the swivel bar for movement along the swivel axis, the locking device including a second locking member for selectively engaging the first locking member, thereby permitting the angle between the tower axis and the swivel axis to be adjusted;
    and wherein:
    the swivel bar includes a pair of trunnion pins; and
    the pins are retained between the tower and the locking apparatus for pivoting movement with respect thereto.

2. The mechanism of claim 1 wherein each of the pins includes a cylindrical surface and an end and the tower and the locking apparatus cover the cylindrical surfaces and the ends of the pins, thereby excluding dirt.

3. The mechanism of claim 1 wherein:
    the locking apparatus includes an apparatus spherical surface;
    the swivel bar includes a swivel spherical surface; and
    the spherical surfaces are conformably curved and substantially contact one another, thereby forming a seal protecting the pins from contaminants.

4. The mechanism of claim 1 wherein:
    the locking apparatus includes a locking clamp;
    the first locking member includes a locking quadrant on the clamp;
    the locking quadrant includes a plurality of ridges and a plurality of grooves; and
    the locking device on the swivel bar includes at least one swivel-mounted locking member engaging one of the grooves.

5. The mechanism of claim 4 wherein:
    each ridge of the plurality of ridges has a ridge surface; and
    the locking device includes a barrier panel substantially contacting the ridge surfaces, thereby inhibiting the entry of contaminants into the grooves.

6. The mechanism of claim 4 including a pair of locking clamps and wherein the locking clamps are generally C-shaped and circumscribe the swivel bar.

7. The mechanism of claim 6 wherein:

the tower includes plural locating notches; and each locking clamp includes a locating finger for engaging a respective one of the locating notches.

8. The mechanism of claim 1 wherein:

the swivel bar includes a pair of trunnion pins and a distal end spaced from the trunnion pins; and the locking device is spring-biased toward the trunnion pins and away from the distal end, thereby retaining the locking members in engagement with one another.

9. The mechanism of claim 8, wherein:

the swivel bar includes a swivel guide portion extending parallel to the swivel axis; and the locking device includes a device guide portion engaging the swivel guide portion and preventing rotating movement of the locking device relative to the swivel bar.

10. The mechanism of claim 8 including a protective boot therearound and wherein:

a latch-release handle engages the locking device and extends outwardly through the boot.

11. The mechanism of claim 1 wherein:

the swivel bar includes a distal end spaced from the tower;

a retaining ring engages the distal end; and a compression spring is confined between the retaining ring and the locking device.

12. The mechanism of claim 11 wherein:

the distal end has an edge and plural sets of edge teeth extending away from the edge;

the sets of teeth define plural arcuate notches therebetween;

the retaining ring has plural sets of ring teeth; and each set of ring teeth engages a respective set of edge teeth, thereby securing the retaining ring to the distal end.

13. The mechanism of claim 11 wherein:

the distal end has an edge and bar lugs extending away from the edge;

the lugs define plural arcuate notches therebetween;

the retaining ring has ring lugs; and each ring lug engages a respective bar lug, thereby securing the retaining ring to the distal end.

14. The mechanism of claim 1 including a biasing spring extending between the tower and the swivel bar and urging the swivel bar to a position at which the swivel axis is angled with respect to the tower axis.

15. The mechanism of claim 14, wherein:

the swivel bar includes a pair of stop surfaces;

the tower includes a pair of stop pads; and one of the stop surfaces is against a respective one of the stop pads when the swivel axis is at a predetermined angle with respect to the tower axis.

16. The mechanism of claim 1 wherein:

the swivel bar includes a pair of trunnion pins;

a steering shaft extends through the swivel bar;

the steering shaft includes first and second shaft components connected by a universal joint in registry with the trunnion pins; and the housing is around a drive shaft coupled to the second shaft component.

17. The mechanism of claim 16 wherein the drive shaft is a pump drive shaft and the mechanism includes:

an oil seal between the pump drive shaft and the housing;

a plate retaining the seal; and a retaining ring lodged in a groove in the housing and retaining the plate in contact with the seal.

18. The mechanism of claim 17 including an oil fill port extending from the housing toward the locking device.

19. The mechanism of claim 17 wherein:

the housing includes first and second housing components;

the tower extends from the first component;

the first and second components include respective locating devices positioning the components with respect to the tower axis.

20. The mechanism of claim 19 wherein:

each of the first and second housing components has an interior end and an exterior end away from the interior end;

each of the first and second housing components tapers outwardly from the exterior end to the interior end; and the interior ends abut at a junction.

21. A tilt steering mechanism including:

a housing having a tower extending along a tower axis;

a locking apparatus fixed with respect to the tower and having a first locking member thereon;

a trunnion swivel bar extending along a swivel axis and mounted for pivoting movement with respect to the tower and the locking apparatus; and a locking device mounted on the swivel bar for movement along the swivel axis, the locking device including a second locking member for selectively engaging the first locking member, thereby permitting the angle between the tower axis and the swivel axis to be adjusted;

and wherein:

the locking apparatus includes a locking clamp;

the first locking member includes a locking quadrant on the clamp;

each locking quadrant includes a plurality of ridges and a plurality of grooves; and the locking device on the swivel bar includes at least one swivel-mounted locking member engaging one of the grooves.

22. The mechanism of claim 21 wherein:

each ridge of the plurality of ridges has a ridge surface; and the locking device includes a barrier panel substantially contacting the ridge surfaces, thereby inhibiting the entry of contaminants into the grooves.

23. The mechanism of claim 21 including a pair of locking clamps and wherein the locking clamps are generally C-shaped and circumscribe the swivel bar.

24. The mechanism of claims 23 wherein:

the tower includes plural locating notches; and each locking clamp includes a locating finger for engaging a respective one of the locating notches.

25. A tilt steering mechanism including:

a housing having a tower extending along a tower axis;

a locking apparatus fixed with respect to the tower and having a first locking member thereon;

a trunnion swivel bar extending along a swivel axis and mounted for pivoting movement with respect to the tower and the locking apparatus; and a locking device mounted on the swivel bar for movement along the swivel axis, the locking device including a second locking member for selectively engaging the first locking member, thereby permitting the angle between the tower axis and the swivel axis to be adjusted;

and wherein:
  the swivel bar includes a pair of trunnion pins and a distal end spaced from the trunnion pins; and
  the locking device is spring-biased toward the trunnion pins and away from the distal end, thereby retaining the locking members in engagement with one another;
and wherein:
  the mechanism includes a protective boot therearound; and
  a latch-release handle engages the locking device and extends outwardly through the boot.

26. A tilt steering mechanism including:
  a housing having a tower extending along a tower axis;
  a locking apparatus fixed with respect to the tower and having a first locking member thereon;
  a trunnion swivel bar extending along a swivel axis and mounted for pivoting movement with respect to the tower and the locking apparatus; and
  a locking device mounted on the swivel bar for movement along the swivel axis, the locking device including a second locking member for selectively engaging the first locking member, thereby permitting the angle between the tower axis and the swivel axis to be adjusted;
and wherein:
  the swivel bar includes a distal end spaced from the tower;
  a retaining ring engages the distal end; and
  a compression spring is confined between the retaining ring and the locking device;
and wherein:
  the distal end has an edge and plural sets of edge teeth extending away from the edge;
  the sets of teeth define plural arcuate notches therebetween;
  the retaining ring has plural sets of ring teeth; and
  each set of ring teeth engages a respective set of edge teeth, thereby securing the retaining ring to the distal end.

27. A tilt steering mechanism including:
  a housing having a tower extending along a tower axis;
  a locking apparatus fixed with respect to the tower and having a first locking member thereon;
  a trunnion swivel bar extending along a swivel axis and mounted for pivoting movement with respect to the tower and the locking apparatus; and
  a locking device mounted on the swivel bar for movement along the swivel axis, the locking device including a second locking member for selectively engaging the first locking member, thereby permitting the angle between the tower axis and the swivel axis to be adjusted;
and wherein:
  the swivel bar includes a distal end spaced from the tower;
  a retaining ring engages the distal end; and
  a compression spring is confined between the retaining ring and the locking device;
and wherein:
  the distal end has an edge and bar lugs extending away from the edge;
  the lugs define plural arcuate notches therebetween;
  the retaining ring has ring lugs; and
  each ring lug engages a respective bar lug, thereby securing the retaining ring to the distal end.

28. A tilt steering mechanism including:
  a housing having a tower extending along a tower axis;
  a locking apparatus fixed with respect to the tower and having a first locking member thereon;
  a trunnion swivel bar extending along a swivel axis and mounted for pivoting movement with respect to the tower and the locking apparatus; and
  a locking device mounted on the swivel bar for movement along the swivel axis, the locking device including a second locking member for selectively engaging the first locking member, thereby permitting the angle between the tower axis and the swivel axis to be adjusted;
and wherein:
  a biasing spring extends between the tower and the swivel bar and urges the swivel bar to a position at which the swivel axis is angled with respect to the tower axis;
and wherein:
  the swivel bar includes a pair of stop surfaces;
  the tower includes a pair of stop pads; and
  one of the stop surfaces is against a respective one of the stop pads when the swivel axis is at a predetermined angle with respect to the tower axis.

29. A tilt steering mechanism including:
  a housing having a tower extending along a tower axis;
  a locking apparatus fixed with respect to the tower and having a first locking member thereon;
  a trunnion swivel bar extending along a swivel axis and mounted for pivoting movement with respect to the tower and the locking apparatus; and
  a locking device mounted on the swivel bar for movement along the swivel axis, the locking device including a second locking member for selectively engaging the first locking member, thereby permitting the angle between the tower axis and the swivel axis to be adjusted;
and wherein:
  the swivel bar includes a pair of trunnion pins;
  a steering shaft extends through the swivel bar;
  the steering shaft includes first and second shaft components connected by a universal joint in registry with the trunnion pins; and
  the housing is around a drive shaft coupled to the second shaft component;
and wherein the drive shaft is a pump drive shaft and the mechanism includes:
  an oil seal between the pump drive shaft and the housing;
  a plate retaining the seal; and
  a retaining ring lodged in a groove in the housing and retaining the plate in contact with the seal.

30. The mechanism of claim 29 including an oil fill port extending from the housing toward the locking device.

31. The mechanism of claim 29 wherein:
  the housing includes first and second housing components;
  the tower extends from the first component;
  the first and second components include respective locating devices positioning the components with respect to the tower axis.

32. The mechanism of claim 31 wherein:
  each of the first and second housing components has an interior end and an exterior end away from the interior end;
  each of the first and second housing components tapers outwardly from the exterior end to the interior end; and
  the interior ends abut at a junction.

* * * * *